Figure 1:
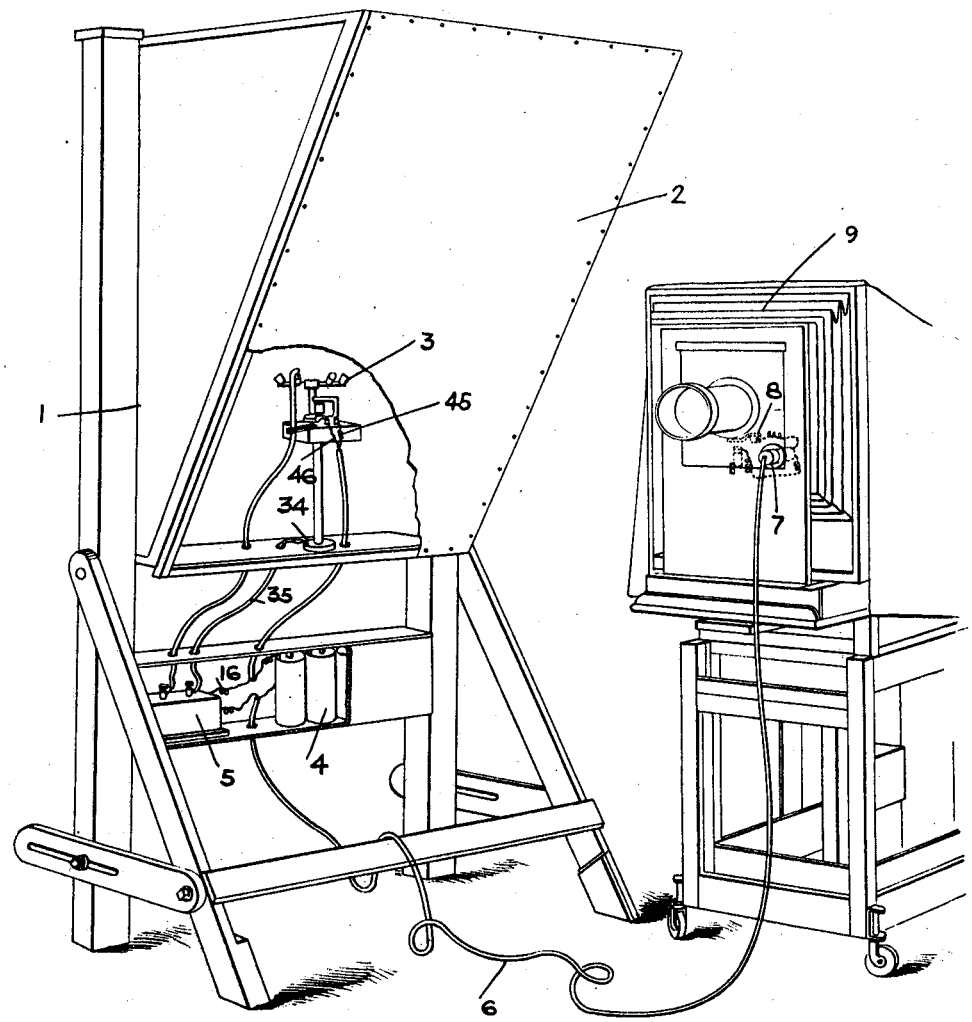

J. L. COURSON.
PHOTOGRAPHER'S FLASH LIGHT.
APPLICATION FILED MAY 25, 1912.

1,063,778.

Patented June 3, 1913.
3 SHEETS—SHEET 2.

WITNESSES
William F. Goebel
A. L. Kitchin

INVENTOR
James L. Courson
BY
ATTORNEYS

J. L. COURSON.
PHOTOGRAPHER'S FLASH LIGHT.
APPLICATION FILED MAY 25, 1912.
1,063,778.
Patented June 3, 1913.
3 SHEETS—SHEET 3.
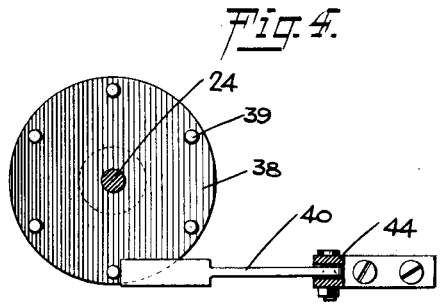
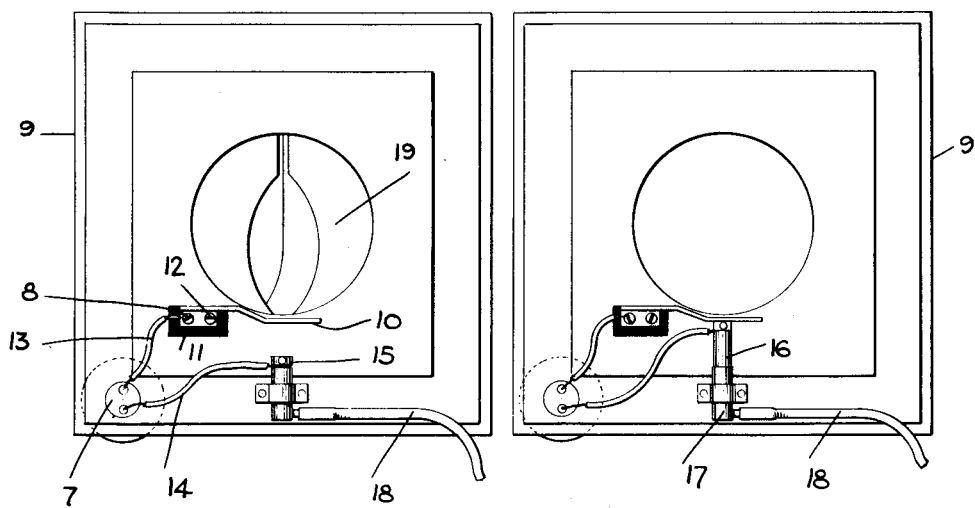
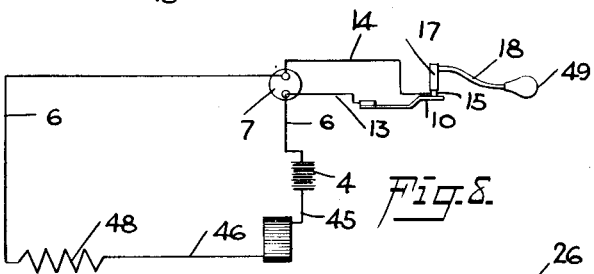
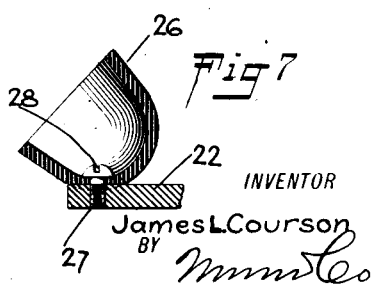
WITNESSES
William P. Goebel.
A. L. Kitchin.
INVENTOR
James L. Courson
BY
ATTORNEYS

UNITED STATES PATENT OFFICE.

JAMES LOGAN COURSON, OF BARBERTON, OHIO.

PHOTOGRAPHER'S FLASH-LIGHT.

1,063,778.  Specification of Letters Patent.  Patented June 3, 1913.

Application filed May 25, 1912. Serial No. 699,826.

*To all whom it may concern:*

Be it known that I, JAMES L. COURSON, a citizen of the United States, and a resident of Barberton, in the county of Summit and State of Ohio, have invented a new and Improved Photographer's Flash-Light, of which the following is a full, clear, and exact description.

This invention relates to flashlights, and particularly to flashlights used by photographers, and has for an object to provide an improved structure in which the flash will be automatic upon the collapsing of the bulb of the camera with which it is associated, and in this way prevent any appreciable time elapsing between the opening of the lens and the flashing of the powder.

Another object of the invention is to provide a flashlight arranged in a housing designed to direct the light in a certain direction in respect to a camera with which it is associated, the connection between the means for causing the flash powder to ignite and the actuation of the shutter of the camera being such as to cause a substantially simultaneous action of the shutter and the flash, so as to permit flashlights to be taken at any time in the day or night.

In carrying out the objects of the invention, a cabinet is provided in which a rotating powder-receiving device is mounted, associated with means for operating or moving the powder receiving means. Arranged in any desired relationship to the cabinet is a camera provided with an electrical switch designed to be operated by the shutter operating mechanism each time that the shutter is opened so as to close the circuit to a sparking device designed to ignite flashing powder. In addition to causing the ignition of the flashing powder upon each closing of the electrical switch, means are actuated for causing the powder-receiving members to be moved one step forward so as to provide a new charge of powder for the next closing of the switch and opening of the shutter of the camera. In this way one or more flashes may be given to each plate in the camera if desired, or the flashes may be given as rapidly as new plates can be substituted in the camera without any reloading of the flashing means. This operation can continue until all of the powder carrying members are exhausted, whereupon a new supply of powder must be provided for each member, or a new set of members substituted.

A practical embodiment of the invention is represented in the accompanying drawings forming a part of this specification, in which similar characters of reference indicate corresponding parts in all the views.

Figure 2:
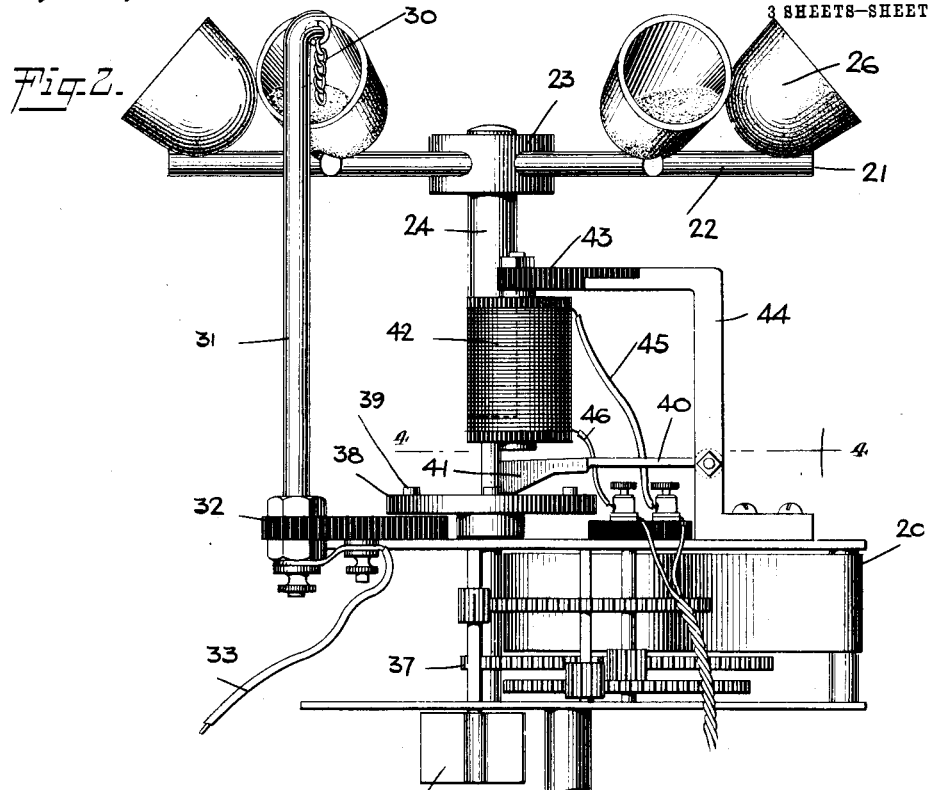
Figure 3:
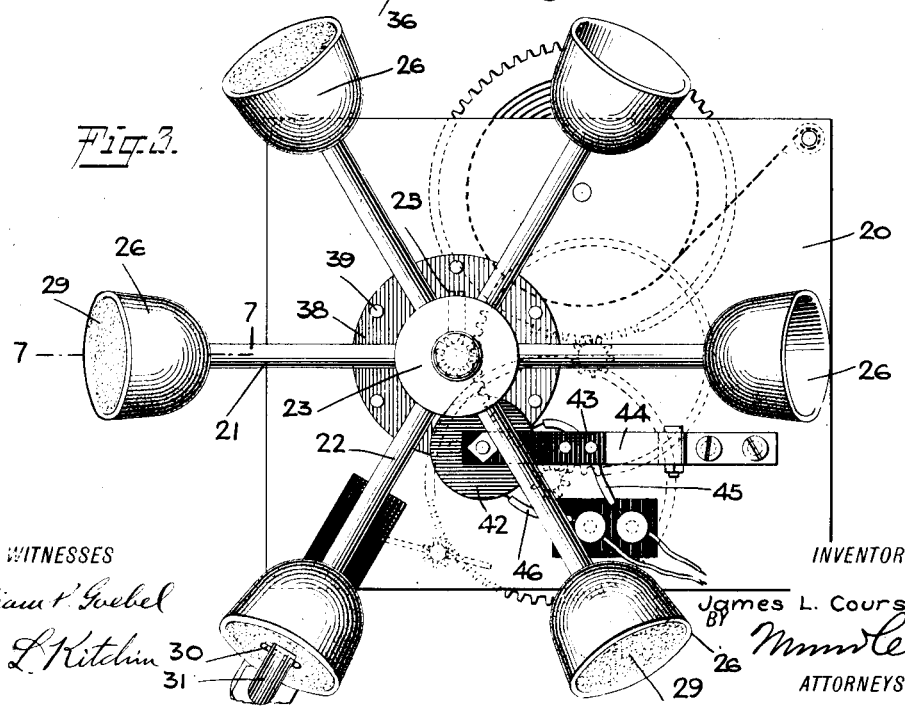

Figure 1 is a perspective view of an embodiment of the invention shown ready for use, certain parts being broken away for better illustrating the construction and arrangement; Fig. 2 is an enlarged side view of the flashing devices and associated mechanism; Fig. 3 is a top plan view of the structure shown in Fig. 2; Fig. 4 is a fragmentary sectional view through Fig. 2 approximately on line 4—4; Fig. 5 is a rear view of the shutter mechanism, the view being taken from a position interiorly of the camera and looking outward toward the lens; Fig. 6 is a view similar to Fig. 5 except that the same shows an electrical switch closed; Fig. 7 is a detail sectional view approximately on line 7—7 of Fig. 3; Fig. 8 is a diagram showing the wiring of the various connections of the electrical circuit.

Referring to the accompanying drawings by numerals, 1 indicates a cabinet having a substantially transparent door 2. Arranged in the cabinet 1 is a flashing device 3 connected to a suitable electrical supply 4 which provides a spark for igniting the powder and also provides current for moving the successive charges of powder to a correct position for being ignited. Interposed in the circuit between the flashing device 3 and the source of supply 4, and also in the circuit of the induction coil 5, are a pair of wires 6 connected by a suitable button 7 to a switch 8, shown more particularly in Figs. 5 and 6. The button 7 may be of the ordinary type wherein the outer portion is adapted to slidingly fit into the inner or stationary portion so that the wires 6 may be connected and disconnected from the camera 9 whenever desired.

The switch 8 (Figs. 5 and 6) is formed with a somewhat resilient tongue 10 rigidly secured to an insulating block 11 by suitable screws 12. The block 11 may be secured to part of the camera by any suitable means so as to hold the tongue or plate 10 substantially in the position shown in Fig. 5. A wire 13 is connected with one of the screws 12 and to one of the binding posts of plug 7, while the other binding post of plug 7 is connected by wire 14 to a movable contact 15 forming the upper end of the shutter operating piston 16. The piston 16 is adapted to freely reciprocate in a tubular member or cylinder 17. The cylinder 17 is connected by a flexible hose or tube 18 to a suitable bulb in common use with cameras and which is adapted to cause the opening of the shutter 19 when collapsed. At the same time that air is forced from the bulb to operate the shutter 19, by raising the piston 16 the contact between member 15 and plate 10 is closed. It will be evident that as the shutter and the piston 16 move simultaneously the shutter will be open at approximately the time when the circuit in which switch 8 is included, is closed, so that the current is supplied to the flashing device 3 immediately after the opening of the shutter. Upon releasing the bulb air is withdrawn from cylinder 17 and the shutter 19 is permitted to close at the usual time, the closing of the shutter 19 being regulated of course by the time set for the same to close, which forms no part of the present invention.

The flashing device 3 (Figs. 2 and 3) comprises principally a motor 20 and a carrier 21. The carrier 21 is formed with a plurality of arms 22 secured to a hub 23 slidingly fitted on a shaft 24 clamped thereto by any desired means, as for instance a set screw 25. Rigidly secured to the arms 22 are a plurality of cups 26 formed of fire-resisting material which is a non-conductor of current. These cups are secured in position (Fig. 7) preferably by a screw 27 having a head 28 extending upwardly above the bottom. The cups 26 are designed to contain flashing powder 29 which is a conductor of electricity though usually a poor conductor, but nevertheless sufficient for causing a spark to jump from the lower end of a chain 30 to the powder, and from thence to the head 28 of the screw 27, whereby the powder is ignited. As soon as the powder has been burned, the current has ceased to flow as the gap between the chain 30 and the head 28 is too great for the current to jump. In this way upon the closing of the circuit by switch 8, current will jump from chain 30 into one of the cups 26 and ignite the powder therein, and as soon as the powder is consumed the current will cease to flow even though switch 8 is maintained closed. The chain 30 is connected with a metallic post 31 which in turn is supported by an insulating block 32 connected with the frame of the motor 20, and supported thereby. A wire 33 is connected to the post 31 and to one side of the secondary of the induction coil 5. The opposite side of the secondary of the induction coil 5 is connected to a base 34 of the motor 20 by wire 35. The circuit of the primary of the induction coil of course includes the switch 8 so that there is no current induced in the secondary until switch 8 is closed and the shutter of the camera is opened.

The motor 20 is formed as an ordinary spring motor of any desired type and will therefore need no special description, the same being, however, provided with a brake 36 for limiting the speed of the motor. The shaft 24 is connected to the motor 20 through gear 37 so that whenever the motor 20 operates, the shaft 24 will turn and will carry with it the respective cups 26. Rigidly secured to the shaft 24 is a disk 38 having a plurality of stops or pins 39 projecting from the upper surface thereof. A pivotally mounted pawl 40, weighted at the end 41, is designed to normally remain in the path of movement of the pins 39 and when moved from such position to fall by gravity back to the original position. The pawl 40 is adapted to be actuated or raised out of the path of movement of the pins 39 by an electromagnet 42 supported by an insulating block 43, held in place by a suitable bracket 44. A wire 45 is connected with one end of the magnet 42 and at the opposite end to the batteries 4, while a wire 46 is connected at one end to the magnet 42 and at the other end to the primary winding of induction coil 5. From the primary winding of the induction coil 5, one of the wires 6 extends to button 7. From battery 4 the second wire 6 extends to one of the binding posts of button 7. By this construction and arrangement whenever switch 8 is closed current may pass from the batteries 4 to magnet 42, to the primary of the induction through the switch 8 and back to the battery. The current flowing in this circuit will energize magnet 42, which will raise pawl 41 and thus release the pins 39 and plate 38 so that motor 20 may rotate the same. Upon opening the switch 8, the magnet will be deënergized and pawl 40 permitted to drop in the path of the next succeeding pin 39, whereby the plate 38 and shaft 24, and all of the cups 26 will be stopped. At the same time that current starts to flow through magnet 42, a current will be induced in the secondary 47 by reason of the fact that current is flowing in the primary 48. The flowing of the current in the secondary 47 will cause a spark to jump from chain 30 to the screw head 28, this action taking place substantially at the instant that current is first turned on by reason of the closing of switch 8. The action of magnet 42 is retarded by the fact that the same must energize its core before pawl 50 can be raised and in this manner permit the powder in the cup 26 arranged opposite motor 20 to be ignited before the carrier 21 is moved.

In describing the operation of the cylinders 17 and the shutter 19, the same have been described as being connected to a single bulb, but if desired two bulbs may be used, one for opening the shutter and another for closing the switch. In either way of forming the device it is intended that the switch 8 shall be closed only temporarily, or only for an instant. If the switch 8 was held closed for too great a length of time, pawl 40 would be held out of contact sufficiently long for a plurality of pins 39 to pass the same, which would result in several filled cups passing chain 30. A pin 39 is provided for each cup so that it is desirable to cause only one pin 39 to pass pawl 40 at a time.

Referring to the diagram shown in Fig. 8, when the bulb 49 is collapsed air will pass through tube 18 to cylinder 17 and will cause the contact member 15 to move into contact with plate 10. When this has been done, current will flow from battery 4 over wires 6 to one of the binding posts of button 7, and from thence over the wire 13 to plate 10. From plate 10 current passes through contact 15, wire 14, one of the binding posts of button 7, one of the wires 6, primary coil 48 of the induction coil 5, wire 46, magnet 42, and wire 45 back to battery 4. Current flowing in this circuit will of course energize wire 42 for raising pawl 40, as hereinbefore described, and at the same time a secondary current will be generated in the secondary winding 47 which causes a spark to jump from chain 30.

In operation after the cups 26 have been properly filled with powder and the camera supplied with a photographic plate, a flash may be provided whenever desired. After the camera has been placed in a proper position for getting a proper focus of the object to be photographed, the shutter mechanism thereof may be operated independently or in conjunction with switch 8. In either event upon the collapsing of the bulb 49, switch 8 will be closed and current will be caused to pass through magnet 42 and an induced current caused to provide a spark at the end of chain 30, resulting in an ignition of the powder in the particular cup 26 arranged opposite or rather beneath chain 30. Upon the energization of the magnet 42 temporarily the pawl 40 will be raised and then dropped so as to engage the next pin 39, the pins 39 and plate 38 beginning a rotary movement immediately upon the raising of the pawl 40, the same being actuated by motor 20. This movement is of course arrested by pawl 40 moving into the path of movement of the next succeeding pin 39 so that the cup 26 into which the spark has jumped will be moved one step forward so that the next filled cup will come beneath chain 30. As soon as pawl 40 has engaged the next succeeding pin 39, the bulb 49 may be again collapsed for closing switch 8 for causing another flash. This operation may be continued until all of the powder in the cups 26 has been ignited. When this has occurred, either the cups 26 must be refilled while in place, or the entire holder 21 may be removed and a new holder substituted.

Having thus described my invention I claim as new and desire to secure by Letters Patent:—

1. In a device of the character described, a holder formed with a plurality of radiating arms, an insulating and fire-resisting cup arranged on each of said arms, a metallic clamp extending through each of said cups into said receiving arms whereby the cups are rigidly clamped in position, and an electrical conductor is provided through the cups, means for rotating said cups step by step, and means for causing an electrical spark to jump into said cups and make connection with said clamping means whereby powder in said cups will be ignited.

2. In a device of the character described, a plurality of powder receiving receptacles, a supporting arm for each of said receptacles, a rotating shaft secured to said arms, a plate formed with a plurality of stops rigidly secured to said shaft and rotated thereby, means for engaging said stops for preventing a rotary movement of said plate, electrically operated means for intermittently moving said last mentioned means out of the way of said stops whereby said powder receiving receptacles are intermittently rotated, and means for causing an electrical spark to jump into one of said receptacles substantially at the time said receptacles begin their rotary movement.

3. In a device of the character described, a plurality of powder receiving receptacles, means for causing a rotation of said powder receiving receptacles, said means including a rotary disk having a plurality of stops arranged thereon, a pivotally mounted pawl arranged in the path of movement of said stops, an electro-magnet for moving said pawl out of the path of said stops, a stationary terminal, a movable terminal arranged in each of said powder receiving receptacles, and means for simultaneously causing current to pass from said stationary terminal to each of said movable terminals as the receptacles come opposite said stationary terminal and to energize said magnet whereby the powder in said receptacles will be successively ignited and said magnet will cause said pawl to be intermittently raised for permitting a rotation of said powder receiving receptacles in order that the various receiving receptacles may be successively positioned adjacent said stationary terminal.

4. In a device of the character described, a plurality of intermittently rotatable powder receiving receptacles, means for rotating said powder receiving receptacles, a stop for each of said receptacles connected with said means, a magnet for limiting the movement of said stops, a circuit for said magnet including the primary of an induction coil, a source of current, and an electrical switch, means for closing said switch, a stationary terminal arranged adjacent the path of movement of said receptacles, coacting terminal arranged in each of said receptacles, and means for connecting the secondary of said induction coil to said terminals whereby when said switch is closed said magnet will be energized and a spark will pass into the powder receiving receptacle positioned opposite said stationary terminal.

5. In a device of the character described, a stationary terminal, a plurality of rotating cups arranged to successively pass said stationary terminal, a second terminal arranged in each of said cups, means for supplying current to said terminals, and means for rotating said cups step by step whereby as the cups successively pass said stationary terminal the spark will jump into said cups.

6. In a device of the character described, a holder provided with a plurality of arms, an insulating and fire-resisting cup arranged on each of said arms, a metallic clamp extended through each of said cups into electrical contact with said arms whereby the cups are clamped in position, and an electrical conductor is provided through the cups, means for moving said cups step by step, and means for causing an electrical spark to jump into said cups and make connection with said clamping means whereby powder in said cups will be ignited.

7. In a device of the character described, a holder formed with a plurality of arms, an insulating and fire-resisting cup arranged on each of said arms, a metallic clamping member extending through each of said cups into said arms whereby the cups are rigidly held in position and an electrical conductor is provided through the cups, a stationary terminal, means for moving said cups step by step past said stationary terminal, and means for causing an electrical spark to jump from said stationary terminal into said cups and make connection with said clamping means whenever said cups pass the stationary terminal whereby powder in said cups will be ignited.

8. In a device of the character described, a holder formed with a plurality of radiating arms, an insulating and fire-resisting cup arranged on each of said arms, a metallic clamp extending through each of said cups into each of said arms whereby the cups are rigidly clamped in position, and an electrical conductor is provided through the cups, a flexible terminal, means for rotating said cups step by step past said flexible terminal whereby the end of said terminal may approach successively the metallic clamps in said cups, and means for causing an electrical spark to jump into said cups and make connection with said clamping means when said terminal and said clamping means are in proximity whereby powder in said cups will be ignited.

In testimony whereof I have signed my name to this specification in the presence of two subscribing witnesses.

JAMES LOGAN COURSON.

Witnesses:
WILLIAM A. MORTON,
MARGARET BRICKER.